(12) United States Patent
Thabit

(10) Patent No.: US 11,433,461 B2
(45) Date of Patent: Sep. 6, 2022

(54) TOOL ADAPTOR HAVING AN INSERT RECEIVING POCKET AND A FASTENING BORE, AND CUTTING TOOL ASSEMBLY

(71) Applicant: Iscar, Ltd., Tefen (IL)

(72) Inventor: Ali Thabit, Yarka (IL)

(73) Assignee: Iscar, Ltd., Tefen (IL)

( * ) Notice: Subject to any disclaimer, the term of this patent is extended or adjusted under 35 U.S.C. 154(b) by 66 days.

(21) Appl. No.: 16/908,796

(22) Filed: Jun. 23, 2020

(65) Prior Publication Data

US 2021/0394278 A1    Dec. 23, 2021

(51) Int. Cl.
    *B23B 29/04*    (2006.01)
    *B23B 27/10*    (2006.01)
    *B23B 27/04*    (2006.01)

(52) U.S. Cl.
    CPC ............ *B23B 29/046* (2013.01); *B23B 27/10* (2013.01); *B23B 29/043* (2013.01); *B23B 27/04* (2013.01); *B23B 2205/02* (2013.01); *B23B 2220/123* (2013.01)

(58) Field of Classification Search
    CPC .......... B23B 2260/132; B23B 2205/04; B23B 27/04; B23B 2205/02; B23B 29/046; B23B 29/043; B23B 2220/123; B23B 27/10
    See application file for complete search history.

(56) References Cited

U.S. PATENT DOCUMENTS 5,267,817 A * 12/1993 Englund ............... B23B 29/043
                                                           407/110
5,795,109 A *  8/1998 Jonsson .................. B23B 27/04
                                                            407/72
6,139,227 A * 10/2000 Schafer .................... B23B 27/04
                                                           407/109

(Continued)

FOREIGN PATENT DOCUMENTS

DE    102019116864 A1 * 12/2020 ........... B23B 29/043
EP         1262262        12/2002

(Continued)

OTHER PUBLICATIONS

International Search Report dated Sep. 7, 2021, issued in PCT counterpart application (No. PCT/IL2021/050631).

(Continued)

*Primary Examiner* — Sara Addisu
(74) *Attorney, Agent, or Firm* — Womble Bond Dickinson (US) LLP

(57) ABSTRACT

A tool adaptor has a front retaining portion and a rear mounting portion, the front retaining portion having a base jaw, a clamping jaw, and an insert receiving pocket located therebetween, and the rear mounting portion having a rear mounting surface and a first fastening bore. A primary slot separates the base jaw from the clamping jaw and communicates with the insert receiving pocket, and a secondary slot transverse to the primary slot separates the clamping jaw from the rear mounting portion. The first fastening bore has (Continued)

a first bore axis which intersects the rear mounting surface and the secondary slot. A cutting tool assembly includes a tool shank, and the tool adaptor secured to a front mounting portion of the tool shank by means of a first fastening screw occupying the first fastening bore and a first shank bore of the front mounting portion.

23 Claims, 6 Drawing Sheets

(56) References Cited

U.S. PATENT DOCUMENTS

| | | | |
|---|---|---|---|
| 6,270,294 B1 | 8/2001 | Sjöö et al. | |
| 7,246,974 B2* | 7/2007 | Hansson | B23B 27/04 407/109 |
| 7,264,424 B2 | 9/2007 | Hansson et al. | |
| 8,701,537 B2* | 4/2014 | Baernthaler | B23B 29/043 83/843 |
| 2001/0019685 A1* | 9/2001 | Hansson | B23B 27/045 407/110 |
| 2005/0129471 A1 | 6/2005 | Englund | |
| 2008/0038072 A1* | 2/2008 | Berminge | B23B 29/046 407/12 |
| 2008/0124180 A1* | 5/2008 | Breisch | B23B 27/10 407/110 |
| 2008/0131215 A1* | 6/2008 | Sjoo | B23B 27/04 407/110 |
| 2010/0178117 A1* | 7/2010 | Watanabe | B23B 27/007 407/11 |
| 2019/0047057 A1* | 2/2019 | Breisch | B23B 29/043 |
| 2019/0084051 A1* | 3/2019 | Noureddine | B23B 29/043 |
| 2020/0254530 A1* | 8/2020 | Flottorp | B23B 29/046 |
| 2021/0260668 A1* | 8/2021 | Henger | B23B 27/10 |
| 2021/0394278 A1* | 12/2021 | Thabit | B23B 29/046 |

FOREIGN PATENT DOCUMENTS

| | | | | |
|---|---|---|---|---|
| JP | 04304902 A | * | 10/1992 | B23B 29/043 |
| JP | 2000225540 A | * | 8/2000 | B23B 27/045 |
| JP | 2013-237153 | | 11/2013 | |
| KR | 10-2009-0008596 | | 1/2009 | |
| KR | 2009 0008596 | | 1/2009 | |
| WO | WO-2005084947 A1 | * | 9/2005 | B23B 29/043 |

OTHER PUBLICATIONS

Written Opinion dated Sep. 7, 2021, issued in PCT counterpart application (No. PCT/IL2021/050631).

* cited by examiner

TOOL ADAPTOR HAVING AN INSERT RECEIVING POCKET AND A FASTENING BORE, AND CUTTING TOOL ASSEMBLY

FIELD OF THE INVENTION

The present invention relates to a tool adaptor with an insert receiving pocket and a fastening bore, and a cutting tool assembly having such tool adaptor, for use in metal cutting processes in general, and for turning and grooving operations in particular.

BACKGROUND OF THE INVENTION

Within the field of cutting tools used in turning and grooving operations, there are some examples of a tool adaptor having an insert receiving pocket and a fastening bore.

U.S. Pat. No. 6,270,294 discloses a tool for parting or grooving having a holder to which is mounted an adapter having an insert-receiving slot formed between support and clamping portions of the adapter. The holder includes a serration meshing with a serration of the adapter. Threaded holes are formed through the serration of the holder, and through-holes are formed in the adapter in alignment with respective holes of the holder. Screws extend through the aligned through-hole and threaded hole to secure the adapter to the holder. A slot intersects through one of the through-holes of the adapter to render the clamping portion elastically deformable. That through-hole includes a conically-shaped entrance surface, and the associated screw includes a conical head which acts as a wedge to force the clamping portion into clamping engagement with the insert.

U.S. Pat. No. 7,264,424 discloses a tool head, which is adapted to receive a cutting insert for chip removal machining, includes a basic holder which has a lower support part and an upper clamping portion defining therebetween and insert-receiving pocket. A slot extends through the basic holder at a location spaced from the pocket, wherein the clamping portion is joined to a remaining portion of the basic holder by a hinge portion about which the clamping portion is elastically displaceable toward the cutting insert. A recess extends through the basic holder parallel to the slot and in communication therewith for receiving a nut roll. A clamping screw extends through a bore of the basic holder and into engagement with the nut roll, wherein the clamping screw is operable to displace the nut roll into the slot to expand the slot and thereby elastically displace the clamping portion about the hinge and toward the cutting insert.

KR 100901472 discloses a modular tool assembly comprising a shank having a connecting surface formed on one end thereof, an adaptor having a mounting surface and a head part, an insert housing part formed in one side of the head part of the adaptor to house an insert, and an engaging structure part disposed oppositely to the connecting surface of the shank and the mounting surface of the adaptor. The engaging structure part includes first and second linear structure parts.

SUMMARY OF THE INVENTION

In accordance with the present invention, there is provided a tool adaptor having an adaptor axis defining an adaptor forward-to-rear direction, and comprising:
a front retaining portion having a base jaw, a clamping jaw, and an insert receiving pocket located therebetween, the insert receiving pocket having a lower support surface and an opposing upper clamping surface, the lower support surface defining a first plane, and
a rear mounting portion located axially rearward of the front retaining portion,
the rear mounting portion having an axially rearward facing rear mounting surface and a first fastening bore,
wherein:
a primary slot separates the base jaw from the clamping jaw and communicates with the insert receiving pocket;
a secondary slot transverse to the primary slot separates the clamping jaw from the rear mounting portion; and
the first fastening bore has a first bore axis which intersects the rear mounting surface and the secondary slot.

Also, in accordance with the present invention, there is provided a cutting tool assembly comprising:
a tool shank longitudinally extending along a shank axis, and the tool adaptor of the sort described above removably secured to a front mounting portion of the tool shank,
the front mounting portion having a front mounting surface and a first shank bore intersecting the front mounting surface,
wherein:
the tool adaptor's rear mounting surface interfaces the shank's front mounting surface, and
a first fastening screw occupies the adaptor's first fastening bore and the shank's first shank bore to secure the tool adaptor to the tool shank.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

As shown in FIGS. 1 to 6, one aspect of the present invention relates to a tool adaptor 20 having an adaptor axis AA defining an adaptor forward-to-rear direction DF, DR, and comprising a front retaining portion 22, and a rear mounting portion 24 located axially rearward of the front retaining portion 22 (i.e. along the adaptor axis AA).

In some embodiments of the present invention, the tool adaptor 20 may be manufactured from tool steel.

Also, in some embodiments of the present invention, the tool adaptor 20 may have a unitary integral one-piece construction.

Figure 1:
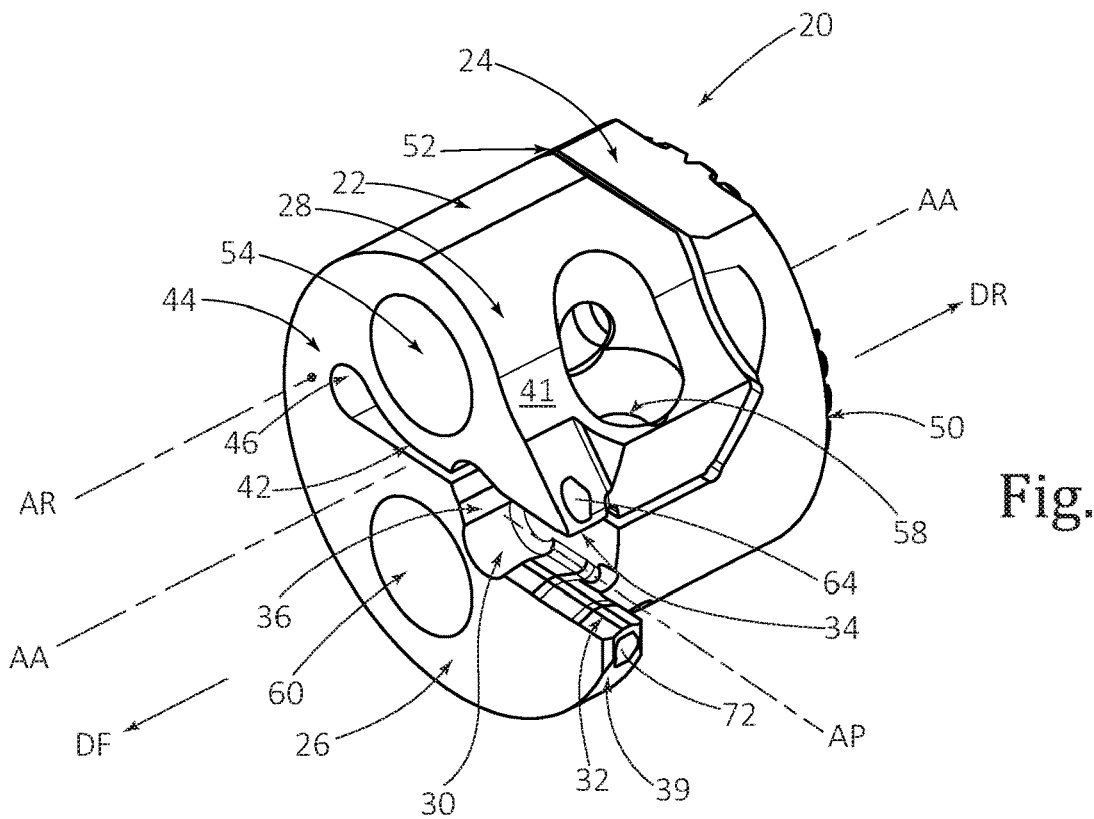
FIG. 1 is a perspective view of a tool adaptor in accordance with some embodiments of the present invention.
Figure 2:
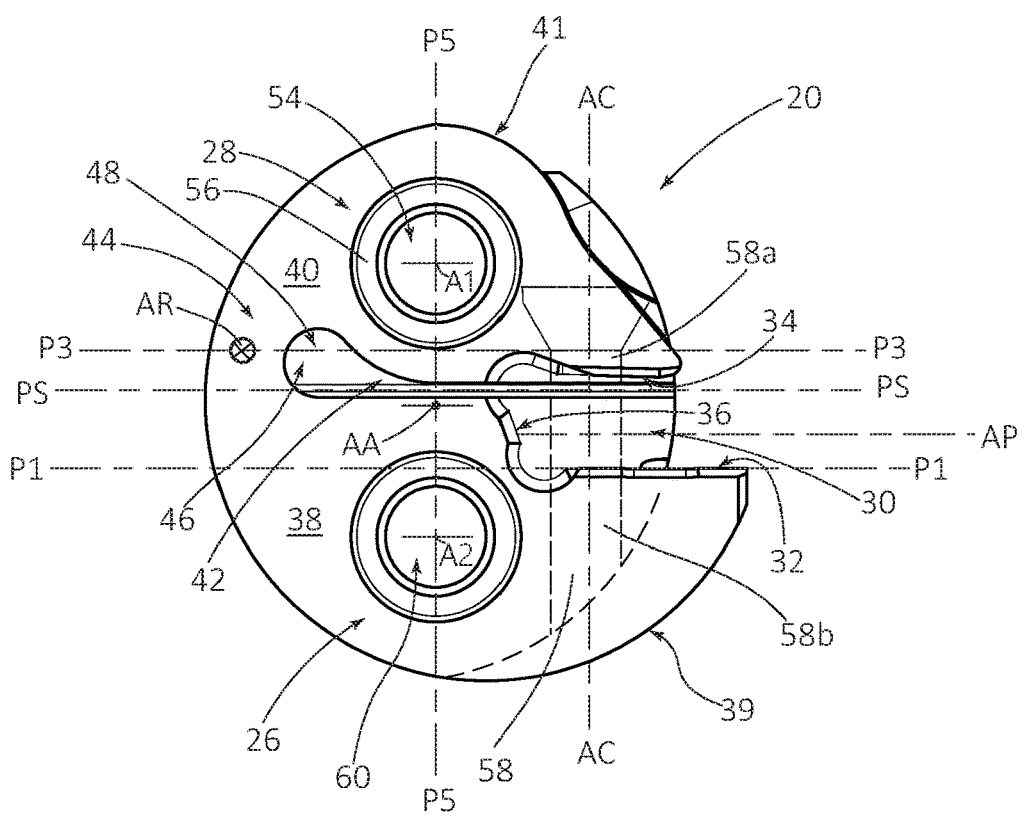
FIG. 2 is a front view of the tool adaptor shown in FIG. 1.
Figure 3:
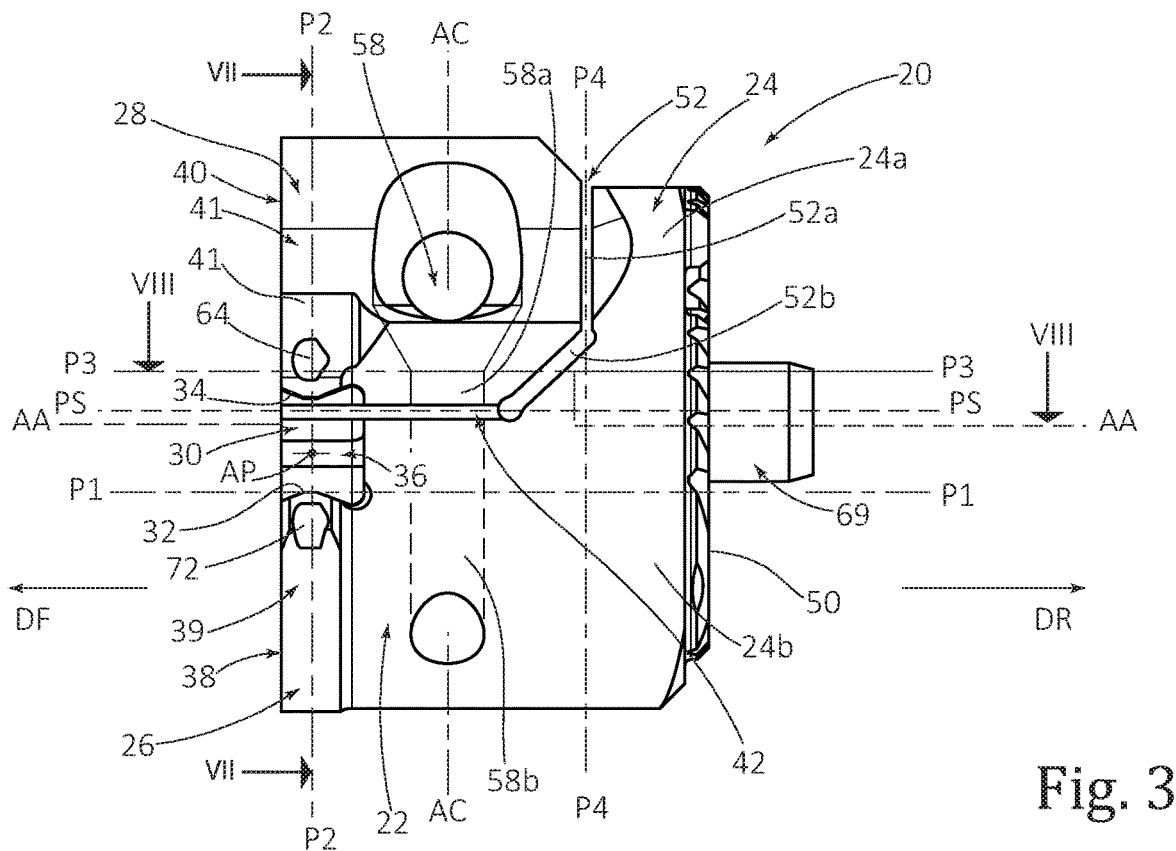
FIG. 3 is a first side view of the tool adaptor shown in FIG. 1.

As shown in FIGS. 1 to 3, the front retaining portion 22 has a base jaw 26, a clamping jaw 28, and an insert receiving pocket 30 located therebetween.

In some embodiments of the present invention, the insert receiving pocket 30 may have a lower support surface 32 and an opposing upper clamping surface 34.

Also, in some embodiments of the present invention, the lower support surface 32 may be formed on the base jaw 26, and the upper clamping surface 34 may be formed on the clamping jaw 28.

As seen in FIGS. 2 and 3, the uppermost portion of the lower support surface 32 lays on a first plane P1.

In some embodiments of the present invention, the first plane P1 may be parallel to the adaptor axis AA.

As seen in the front view of FIG. 2, the adaptor 20 is rotationally oriented about the adaptor axis AA such that the clamping jaw 28 is above the base jaw 26 and the projection of the first plane P1 extends horizontally on the page.

As shown in FIGS. 1 to 3, the lower support surface 32 and the upper clamping surface 34 may correspondingly extend along a pocket axis AP transverse to the adaptor axis AA.

In some embodiments of the present invention, the pocket axis AP may be parallel to the first plane P1 and extend in a direction coincident with an insertion direction of a cutting insert into the insert receiving pocket 30.

In some embodiments of the present invention, the insert receiving pocket 30 may have a stopper surface 36 formed on the base jaw 26. The stopper surface 36 may be transverse to the lower support surface 32.

As shown in FIGS. 1 to 3, the base jaw 26 may have an axially forward-facing base jaw front surface 38 and a radially outward-facing base jaw peripheral surface 39.

Also, as shown in FIGS. 1 to 3, the clamping jaw 28 may have an axially forward-facing clamping jaw front surface 40 and a radially outward-facing clamping jaw peripheral surface 41. In some embodiments of the present invention, the lower support surface 32 may intersect the base jaw front surface 38, and the upper clamping surface 34 may intersect the clamping jaw front surface 40.

Also, in some embodiments of the present invention, the stopper surface 36 may intersect the base jaw front surface 38.

Further, in some embodiments of the present invention, the base jaw front surface 38 and the clamping jaw front surface 40 may be coplanar.

As shown in FIGS. 2 and 3, a primary slot 42 separates the base jaw 26 from the clamping jaw 28 and communicates with the insert receiving pocket 30.

In some embodiments of the present invention, the clamping jaw 28 may be resiliently displaceable relative to the base jaw 26.

Also, in some embodiments of the present invention, the primary slot 42 may have a terminal end portion 46 located away from the insert receiving pocket 30.

As shown in FIGS. 2 and 3, a slot plane PS may pass through at least a portion of the primary slot 42, in-between the base jaw 26 and the clamping jaw 28.

In some embodiments, the slot plane PS may bisect said portion of the primary slot 42.

Also, in some embodiments, the slot plane PS may be parallel to the first plane P1.

As shown in FIGS. 1 and 2, the base jaw 26 and the clamping jaw 28 may mutually merge with a clamping pivot portion 44 adjacent the primary slot's terminal end portion 46.

Figure 7:
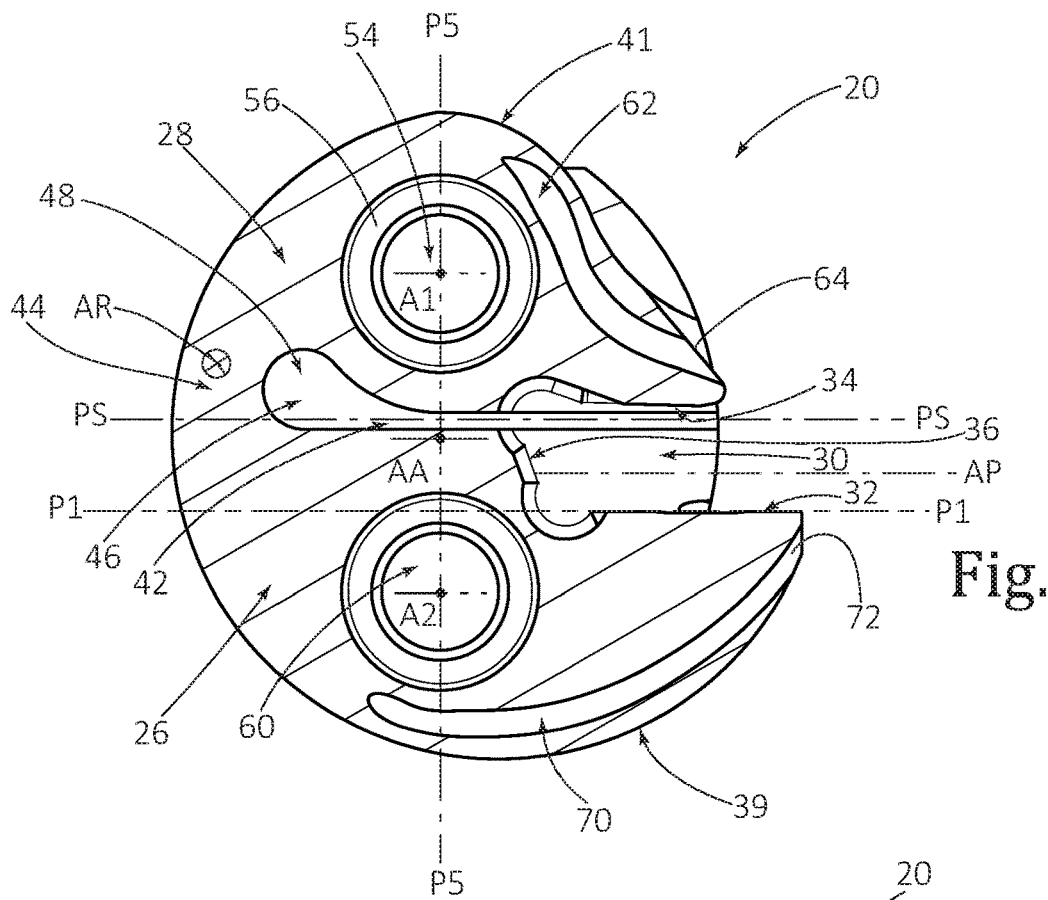
FIG. 7 is a cross-sectional view of the tool adaptor shown in FIG. 3, taken along the line VII-VII.

As shown in FIG. 7, in a cross-section taken in a second plane P2 perpendicular to the adaptor axis AA and passing through the insert receiving pocket 30, the terminal end portion 46 of the primary slot 42 may be distally located from the insert receiving pocket 30.

In some embodiments of the present invention, the clamping jaw pivot portion 44 may have a resilient axis of rotation AR extending along the adaptor forward-to-rear direction DF, DR.

Also, in some embodiments of the present invention, the resilient axis of rotation AR may be parallel to the adaptor axis AA.

Further, in some embodiments of the present invention, the terminal end portion 46 of the primary slot 42 may include a primary stress relief groove 48 extending parallel to the resilient axis of rotation AR.

For embodiments of the present invention in which the primary slot 42 has a terminal end portion 46, and the clamping jaw pivot portion 44 has a resilient axis of rotation AR extending along the adaptor forward-to-rear direction DF, DR, due to conventional machining limitations, it may be advantageous to produce the tool adaptor 20 by means of additive manufacturing. In such case, the tool adaptor 20 is considered to be an "additively manufactured tool adaptor".

As shown in FIGS. 3 and 7, the second plane P2 may intersect the insert receiving pocket's lower support surface 32 and upper clamping surface 34.

Also, as shown in FIGS. 3 and 7, the second plane P2 may intersect the insert receiving pocket's stopper surface 36.

In some embodiments of the present invention, the pocket axis AP may be contained in the second plane P2.

Also, in some embodiments, in addition to containing the pocket axis AP, the second plane P2 may be perpendicular to the first plane P1 and the adaptor axis AA.

As shown in FIGS. 3 to 6, the rear mounting portion 24 has an axially rearward facing rear mounting surface 50, and a secondary slot 52 transverse to the primary slot 42 separates the clamping jaw 28 from the rear mounting portion 24.

For such embodiments of the present invention, the clamping jaw 28 may be resiliently displaceable relative to the rear mounting portion 24, as well as the base jaw 26.

Also, for such embodiments of the present invention, the rear mounting portion 24 and the base jaw 26 may have a combined rigidity. In other words, the rear mounting portion 24 and the base jaw 26 are not resiliently displaceable relative to one another, even though the clamping jaw 28 is resiliently displaceable with respect to both the rear mounting portion 24 and the base jaw 26.

Figure 4:
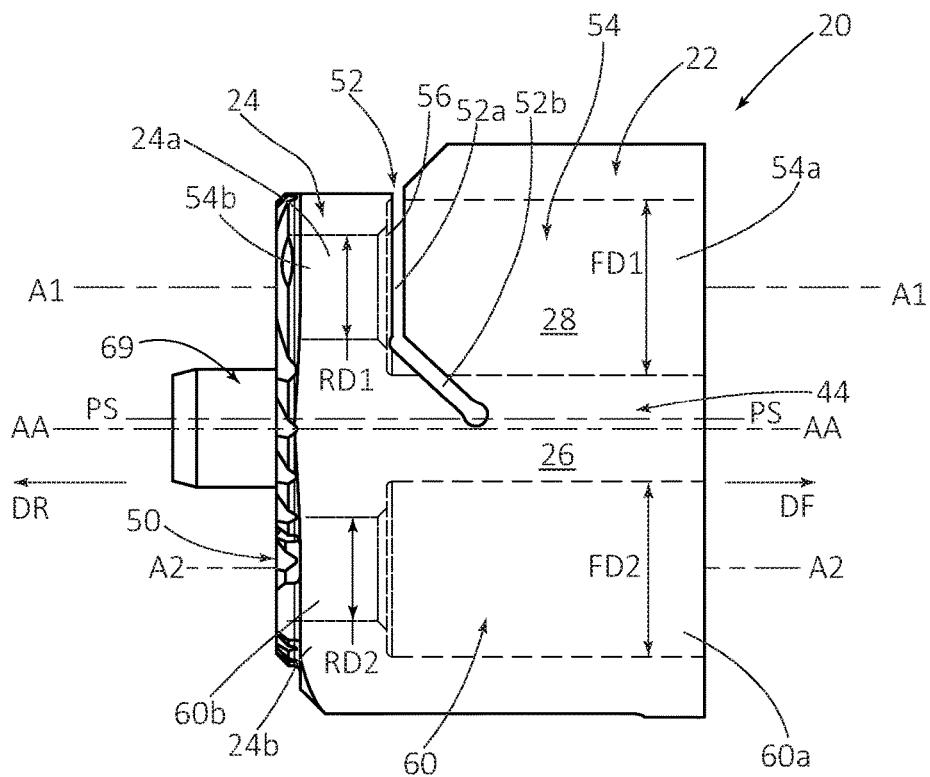
FIG. 4 is a second side view of the tool adaptor shown in FIG. 1.

As seen in FIGS. 3 and 4, the rear mounting portion 24 may be considered to comprise a first rear sub-portion 24a located axially rearward of (i.e. along the adaptor axis AA) and spaced apart from the clamping jaw 28, and a second rear sub-portion 24b located axially rearward of (i.e., along the adaptor axis AA) and connected to the base jaw 26. Thus, it should be appreciated that configuring the clamping jaw 28 to be resiliently displaceable relative to the rear mounting portion 24, as well as the base jaw 26, advantageously enables both the first rear sub-portion 24a and the second rear sub-portion 24b to be utilized for mounting the tool adaptor 20 to an interfacing member.

In some embodiments of the present invention, the rear mounting surface 50 may be at least partially serrated.

Figure 6:
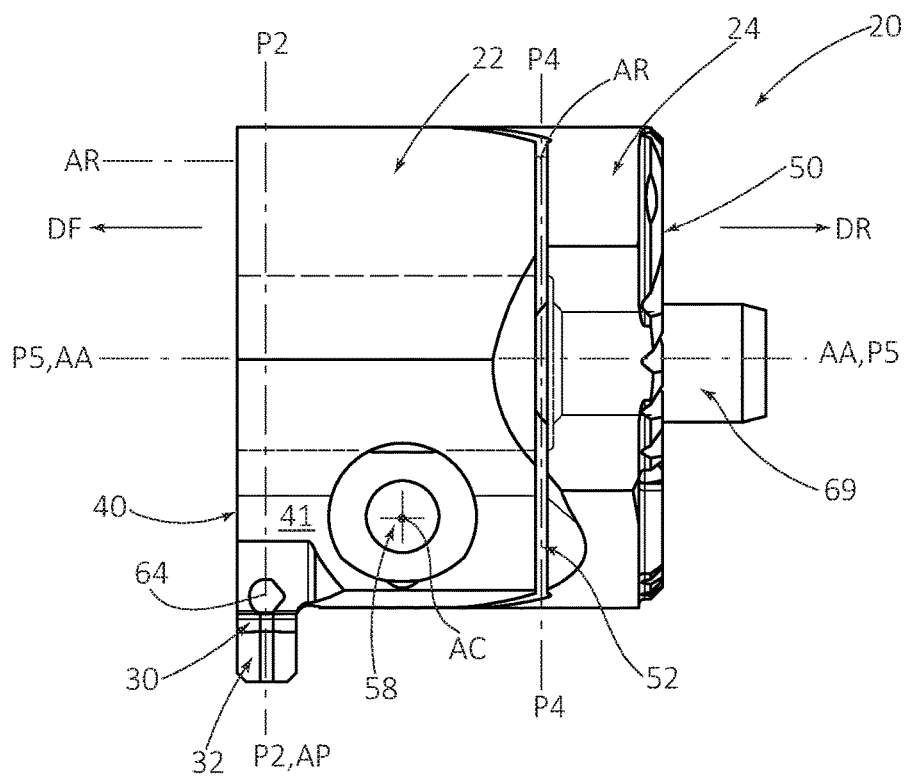
FIG. 6 is a top view of the tool adaptor shown in FIG. 1.

As shown in FIGS. 3, 4 and 6, the secondary slot 52 may be transverse to the adaptor axis AA.

In some embodiments of the present invention, as shown in FIG. 3, the secondary slot 52 may communicate with the primary slot 42.

Also, in some embodiments of the present invention, as shown in FIG. 6, the resilient axis of rotation AR may intersect the secondary slot 52.

Figure 8:
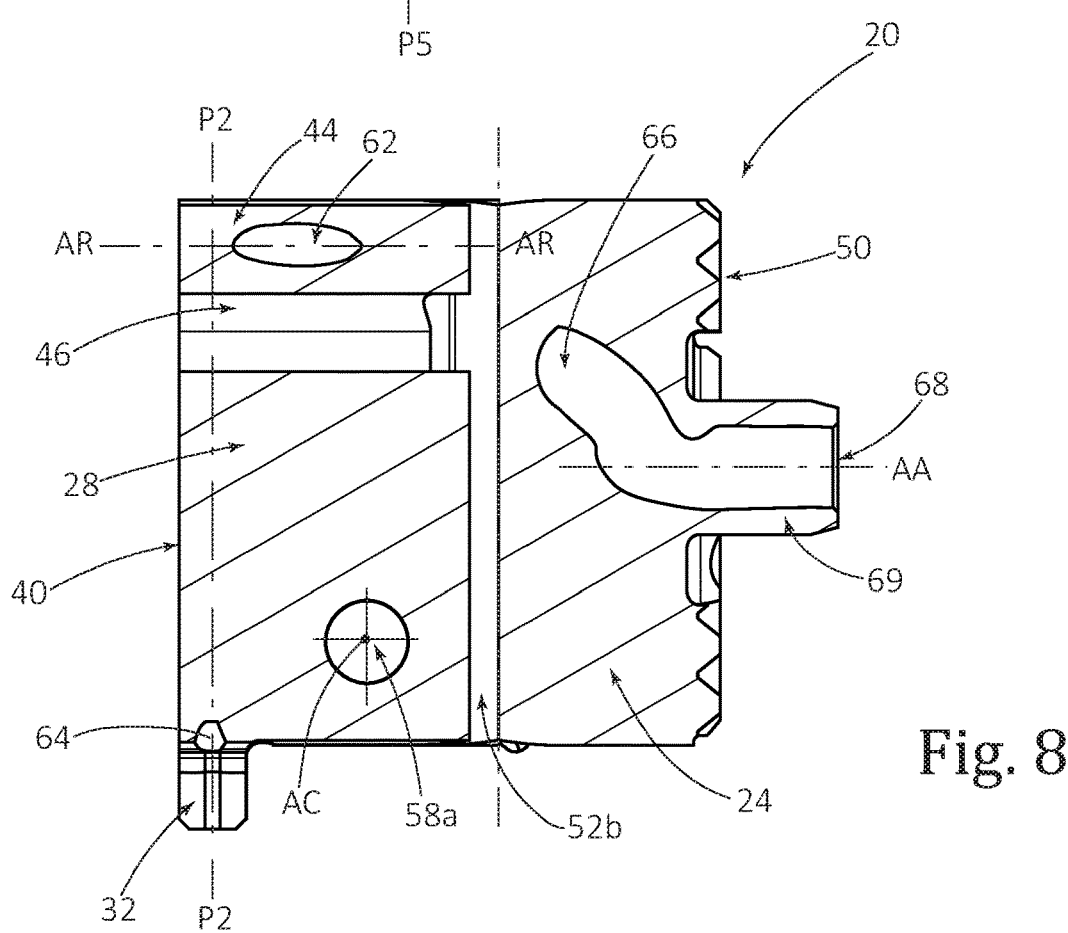
FIG. 8 is a cross-sectional view of the tool adaptor shown in FIG. 3, taken along the line VIII-VIII.

As shown in FIG. 8, in a cross-section of FIG. 3 taken in a third plane P3 parallel to the slot plane PS and intersecting the clamping jaw 28, the rear mounting portion 24 and the clamping jaw 28 may be entirely spaced apart by the secondary slot 52.

In some embodiments of the present invention, in a cross-section taken in any plane parallel to the slot plane PS and intersecting the clamping jaw 28, the rear mounting portion 24 and the clamping jaw 28 may be entirely spaced apart by the secondary slot 52.

As shown in the side views of the tool adaptor 20 in FIGS. 3 and 4, the secondary slot 52 may have a major secondary slot portion 52a and a minor secondary slot portion 52b, and the minor secondary slot portion 52b may be inclined with respect to the major secondary slot portion 52a.

For such embodiments of the present invention, the secondary slot 52 may be described as having an angled configuration.

In some embodiments of the present invention, a fourth plane P4 perpendicular to the first plane P1 may bisect the major secondary slot portion 52a.

Also, in some embodiments of the present invention, the slot plane PS may intersect the minor secondary slot portion 52b.

It should be appreciated that for embodiments of the present invention in which the secondary slot 52 has an angled configuration, the base jaw 26 and the rear mounting portion 24 may be configured with an increased level of combined rigidity.

Also, for embodiments of the present invention in which the secondary slot 52 has an angled configuration, due to conventional machining limitations, it may be advantageous to produce the tool adaptor 20 by means of additive manufacturing.

Figure 5:
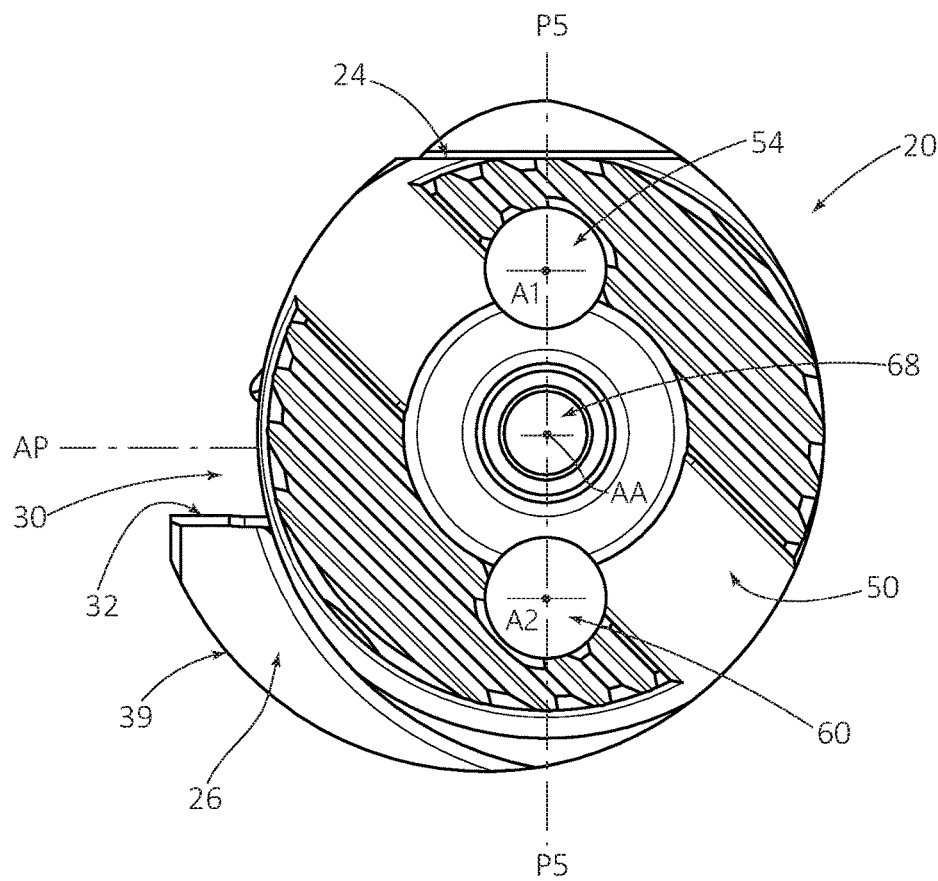
FIG. 5 is a rear view of the tool adaptor shown in FIG. 1.

As shown in FIGS. 4 and 5, the rear mounting portion 24 has a first fastening bore 54, and the first fastening bore 54 has a first bore axis A1 which intersects the rear mounting surface 50 and the secondary slot 52.

In some embodiments of the present invention, the first bore axis A1 may intersect the clamping jaw 28.

Also, in some embodiments of the present invention, the first bore axis A1 may be parallel to the adaptor axis AA.

Further, in some embodiments of the present invention, the first fastening bore 54 may be a through bore, and the first fastening bore 54 may extend through the rear mounting portion 24 and the clamping jaw 28.

In other embodiments of the present invention (not shown), the first fastening bore 54 may be a threaded bore, entirely located in the rear mounting portion 24.

It should be appreciated that the first fastening bore 54 may be utilized for mounting the tool adaptor 20 to an interfacing member.

As shown in FIGS. 2, 4 and 5, the first fastening bore 54 may include a first front bore portion 54a having a first front diameter FD1 and a first rear bore portion 54b having a first rear diameter RD1.

For such embodiments of the present invention, first fastening bore 54 may be described as having a stepped configuration.

In some embodiments of the present invention, the first front bore portion 54a may be coaxial with the first rear bore portion 54b.

As shown in FIGS. 2, 4 and 5, the first rear bore portion 54b may be entirely located in the rear mounting portion 24, the first front bore portion 54a may be located axially forward of the first rear bore portion 54b (i.e. along the adaptor axis AA), and the first front diameter FD1 may be greater than the first rear diameter RD1.

In some embodiments of the present invention, the first rear bore portion 54b may intersect the rear mounting surface 50.

As shown in FIGS. 4 and 6, the rear mounting portion 24 may have an axially forward-facing first bearing surface 56, and the first rear bore portion 54b may intersect the first bearing surface 56.

In some embodiments of the present invention, first bearing surface 56 may be annular shaped.

As shown in FIGS. 4 and 6, the secondary slot 52 may intersect the first front bore portion 54a.

In some embodiments of the present invention, the first front bore portion 54a may intersect the clamping jaw front surface 40.

Also, in some embodiments of the present invention, the first front bore portion 54a may be circumferentially enclosed by the clamping jaw 28, and as shown in FIG. 2, in a front view of the tool adaptor 20, the entire circumference of the first front bore portion 54a may intersect the clamping jaw front surface 40.

In other embodiments of the present invention (not shown), the first front bore portion 54a may not be circumferentially enclosed by the clamping jaw 28, and the first front bore portion 54a may circumferentially intersect the clamping jaw peripheral surface 41.

As shown in FIGS. 2, 3 and 6, the front retaining portion 22 may include a clamping bore 58 extending along a clamping axis AC, and the clamping bore 58 may have first and second clamping bore portions 58a, 58b spaced apart by the primary slot 42.

In some embodiments of the present invention, the first and second clamping bore portions 58a, 58b may coaxially extend along the clamping axis AC.

Also, in some embodiments of the present invention, as best seen in FIG. 2, the clamping axis AC may intersect the first plane P1.

In other embodiments of the present invention (not shown), the front retaining portion 22 may be devoid of a clamping bore 58, and an external force may be applied to widen the distance between the lower support surface 32 and the upper clamping surface 34 for both insertion and release of a cutting insert, respectively into and from the insert receiving pocket 30.

As shown in FIGS. 2 and 3, the first clamping bore portion 58a may be a through bore, and the second clamping bore portion 58b may be a threaded bore.

In some embodiments of the present invention, the first clamping bore portion 58a may be formed in the clamping jaw 28, and the second clamping bore portion 58b may be formed in the base jaw 26.

Also, in some embodiments of the present invention, the second clamping bore portion 58b may be entirely located axially rearward of the insert receiving pocket 30 (i.e. along the adaptor axis AA).

Further, in some embodiments of the present invention, the first clamping bore portion 58a may include a countersunk portion to accommodate a clamping screw head.

As shown in FIGS. 2 and 6, a fifth plane P5 perpendicular to the first plane P1 may contain the first bore axis A1, and the clamping bore 58 and the insert receiving pocket 30 may be located on the same side of the fifth plane P5.

In some embodiments of the present invention, the fifth plane P5 may contain the adaptor axis AA.

As shown in FIG. 2, in the front view of the tool adaptor 20, an axial projection of the clamping axis AC may intersect the insert receiving pocket 30.

As shown in FIGS. 4 and 5, the rear mounting portion 24 may include a second fastening bore 60, and the second fastening bore 60 may have a second bore axis A2 which intersects the rear mounting surface 50.

In some embodiments of the present invention, the first fastening bore 54 and the second fastening bore 60 may be located on opposite sides of the slot plane PS.

As shown in FIGS. 2, 4 and 5, the second fastening bore 60 may be a through bore, and the second fastening bore 60 may extend through the rear mounting portion 24 and the base jaw 26.

In some embodiments of the present invention, the second bore axis A2 may intersect the base jaw front surface 38.

It should be appreciated that the second fastening bore 60 may be utilized for mounting the tool adaptor 20 to an interfacing member.

As shown in FIGS. 2 and 4, the second fastening bore 60 may have a stepped configuration and include a second front bore portion 60a having a second front diameter FD2 and a second rear bore portion 60b having a second rear diameter RD2.

In some embodiments of the present invention, the second front bore portion 60a may be located axially forward of the second rear bore portion 60b (i.e. along the adaptor axis AA), and the second front diameter FD2 may be greater than the second rear diameter RD2.

As shown in FIGS. 1, 3, 7 and 8, the tool adaptor 20 may include an upper coolant passage 62 extending through the clamping jaw 28.

In some embodiments of the present invention, the upper coolant passage 62 may have an upper exit aperture 64 in the clamping jaw peripheral surface 41 adjacent the insert receiving pocket's upper clamping surface 34.

As shown in FIG. 3, the second plane P2 may bisect the upper exit aperture 64.

In some embodiments of the present invention, the upper coolant passage 62 may communicate with a central coolant passage 66 extending through the rear mounting portion 24.

Also, in some embodiments of the present invention, the central coolant passage 66 may have a rear entry aperture 68 in, or associated with, the rear mounting surface 50.

As shown in FIG. 3, the rear entry aperture 68 may be formed in a rear centering conduit 69 extending rearwardly from the rear mounting surface 50.

In some embodiments of the present invention, the rear entry aperture 68 may have a center coincident with the adaptor axis AA.

It should be appreciated that for embodiments of the present invention in which the primary slot 42 has a terminal end portion 46, and the base and clamping jaws 26, 28 mutually merge with the clamping pivot portion 44, as shown in FIG. 8, the front retaining portion 22 is advantageously configured to provide an efficient route for the upper coolant passage 62 to communicate with the central coolant passage 66.

It should also be appreciated that for embodiments of the present invention in which the secondary slot 52 has an angled configuration, greater space is provided axially rearward of the minor secondary slot portion 52b (i.e. along the adaptor axis AA), to efficiently route the central coolant passage 66.

As shown in FIGS. 1, 3 and 7, the tool adaptor 20 may include a lower coolant passage 70 extending through the base jaw 26.

In some embodiments of the present invention, the lower coolant passage 70 may have a lower exit aperture 72 in the base jaw peripheral surface 43 adjacent the insert receiving pocket's lower support surface 48.

As shown in FIG. 3, the second plane P2 may bisect the lower exit aperture 72.

In some embodiments of the present invention, the lower coolant passage 70 may communicate with the central coolant passage 66.

It should be appreciated that producing the tool adaptor 20 by means of additive manufacturing may advantageously facilitate efficient routing of the upper, central, and lower coolant passages 62, 66, 70.

As shown in FIGS. 9 to 12, another aspect of the present invention relates to a cutting tool assembly 74 comprising a tool shank 76 longitudinally extending along a shank axis AS, and the tool adaptor 20 removably secured to a front mounting portion 78 of the tool shank 76.

In some embodiments of the present invention, the tool shank 76 may be elongated and include an anti-vibration component (not shown).

Also, in some embodiments of the present invention, the shank axis AS and the adaptor axis AA may be coaxial.

Further, in some embodiments of the present invention, at least the tool shank's front mounting portion 78 may be cylindrical and have a shank diameter DS centered about the shank axis AS.

Figure 10:
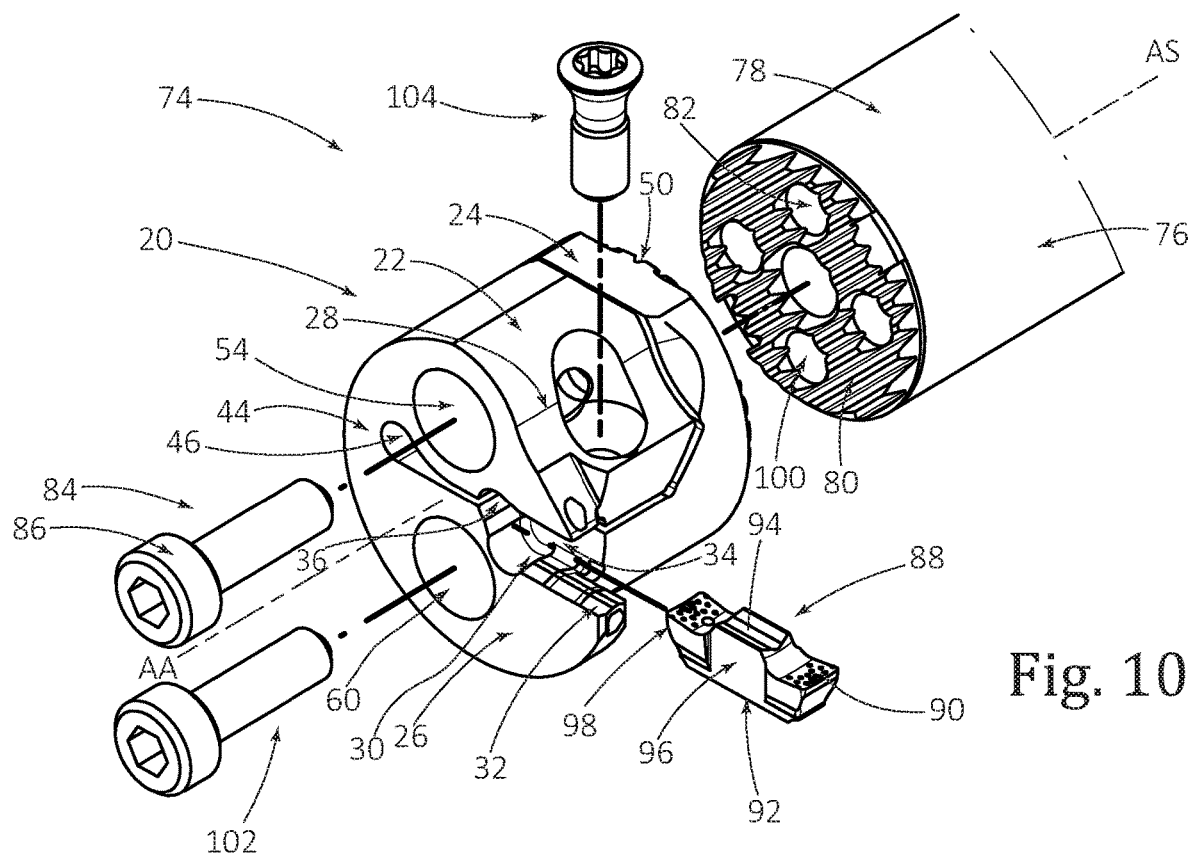
FIG. 10 is an exploded perspective view of the cutting tool assembly shown in FIG. 9.

As shown in FIG. 10, the front mounting portion 78 has a front mounting surface 80, and a first shank bore 82 intersecting the front mounting surface 80.

In some embodiments of the present invention, the shank axis AS may intersect the shank's front mounting surface 80.

Also, in some embodiments of the present invention, the front mounting surface 80 may be at least partially serrated.

Figure 9:
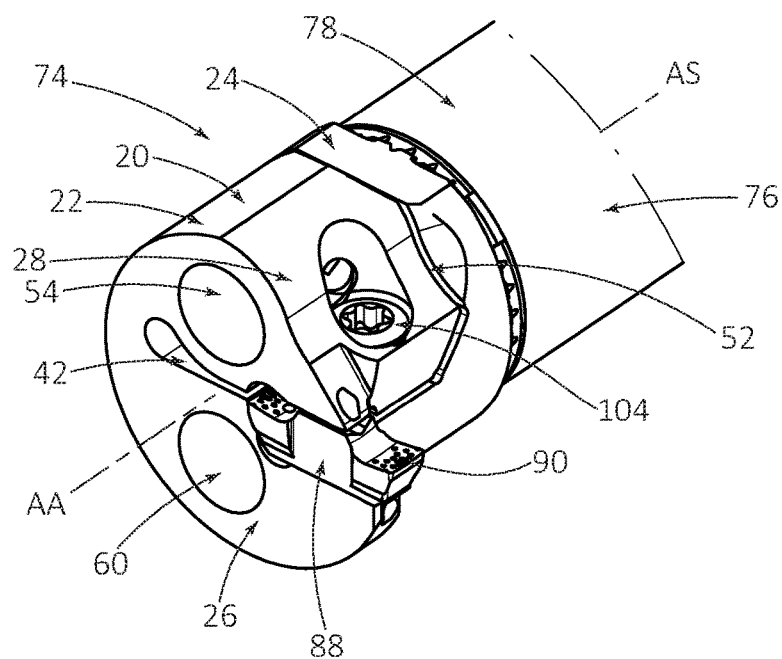
FIG. 9 is a perspective view of a cutting tool assembly in accordance with some embodiments of the present invention.
Figure 12:
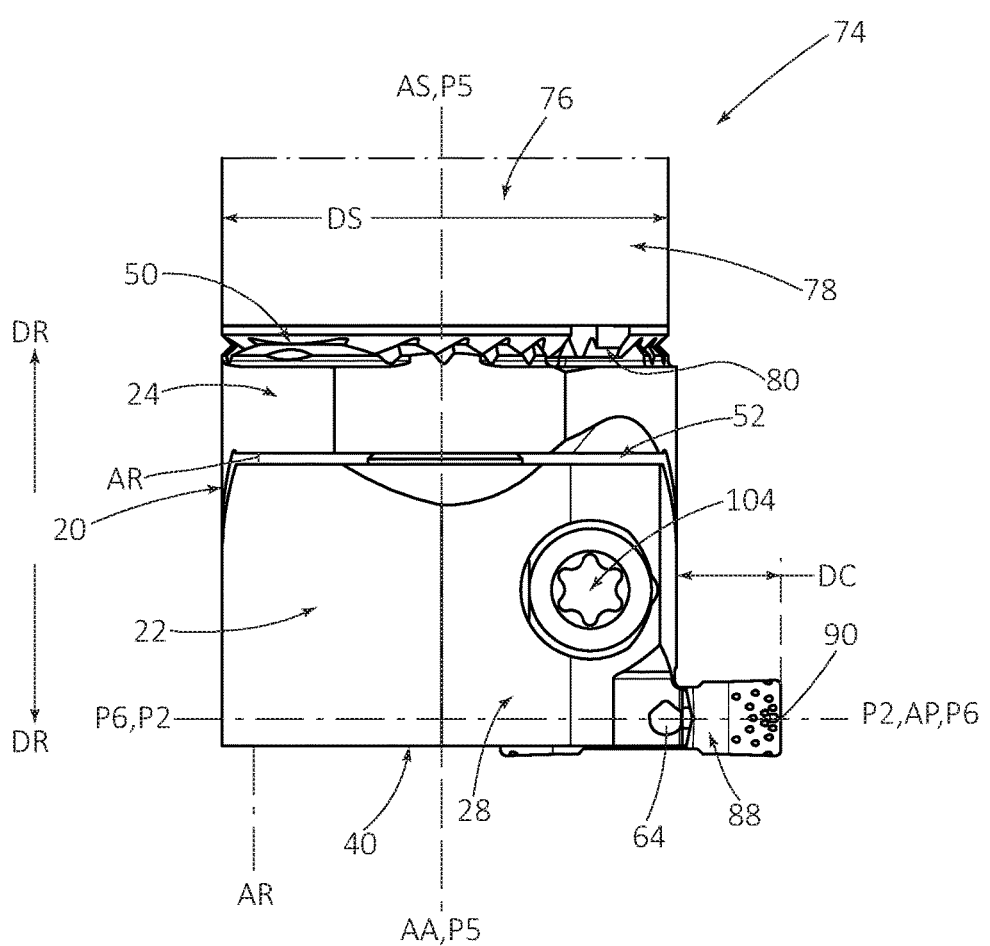
FIG. 12 is a top view of the cutting tool assembly shown in FIG. 9.

As shown in FIGS. 9 and 12, the tool adaptor's rear mounting surface 50 interfaces the shank's front mounting surface 80, and a first fastening screw 84 occupies the adaptor's first fastening bore 54 and the shank's first shank bore 82 to secure the tool adaptor 20 to the tool shank 76.

In some embodiments of the present invention, the first fastening bore 54 and the first shank bore 82 may be coaxial.

Also, in some embodiments of the present invention, the first shank bore 82 may be a threaded bore, and the first fastening screw 84 may threadingly engage the first shank bore 82.

Further, in some embodiments of the present invention, the first fastening screw 84 may have a first screw head 86, and rotational tightening of the first fastening screw 84 may result in fastening contact between the first screw head 86 and the rear mounting portion's first bearing surface 56.

It should be appreciated that rotational tightening or loosening of the first fastening screw 84 may not result in resilient displacement of the clamping jaw 28 relative to the base jaw 26.

As shown in FIGS. 9 to 12, a cutting insert 88 may be removably retained in the insert receiving pocket 30.

In some embodiments of the present invention, the cutting insert 88 may preferably be manufactured by form pressing and sintering a cemented carbide, such as tungsten carbide, and may be coated or uncoated.

Also, in some embodiments of the present invention, the cutting insert 88 may have one operative cutting edge 90, and a sixth plane P6 perpendicular to the adaptor axis AA may bisect the operative cutting edge 90.

As shown in FIG. 12, the sixth plane P6 may be coincident with the second plane P2.

For embodiments of the present invention in which the pocket axis AP is transverse to the adaptor axis AA and the sixth plane P6 bisects the operative cutting edge 90, the cutting tool assembly 74 may be used in internal grooving operations.

Figure 11:
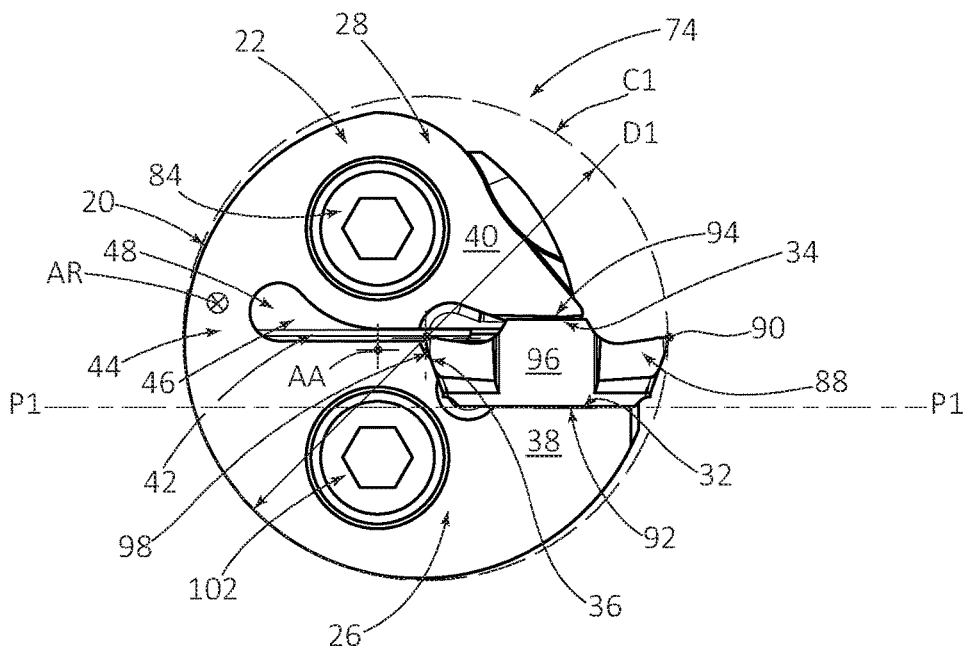
FIG. 11 is a front view of the cutting tool assembly shown in FIG. 9.

As shown in FIG. 11, in a front view of the cutting tool assembly 74, a first imaginary circle C1 contained in the sixth plane P6 circumscribes both the tool adaptor 20 and the cutting insert 88 removably retained therein, and the first imaginary circle C1 has a first diameter D1.

In some embodiments of the present invention, the first diameter D1 may be greater than the shank diameter DS.

As shown in FIG. 11, in the front view of the cutting tool assembly 74, the first imaginary circle C1 may contain the entire tool adaptor 20 and the entire front mounting portion 78 of the tool shank 76.

In some embodiments of the present invention, the cutting tool assembly 74 may have a cutting depth DC along a pocket axis AP.

Also, in some embodiments of the present invention, the cutting depth DC may be greater than half the difference between the first diameter D1 and the shank diameter DS, i.e. DC>(D1−DS)/2.

One size example of the cutting tool assembly 74 may have a first diameter D1 of 20 mm, a shank diameter DS of 16 mm, and a cutting depth CD of 3 mm.

It should be appreciated that for cutting tool assemblies 74 having a first diameter D1 of less that 40 mm, the above-mentioned configurations of the clamping pivot portion 44 being formed between the base jaw 26 and the clamping jaw 28, and the secondary slot 52 having an angled configuration, are particularly advantageous for achieving efficient routing of the upper and central coolant passages 62, 66, respectively.

As shown in FIG. 10, the cutting insert 88 may include opposing lower and upper abutment surfaces 92, 94 and an insert peripheral surface 96 therebetween.

In some embodiments of the present invention, the operative cutting edge 90 may be formed at the intersection of the upper abutment surface 94 and the insert peripheral surface 96.

Also, in some embodiments of the present invention, the insert peripheral surface 96 may include a rear abutment surface 98 distal from the operative cutting edge 90.

As shown in FIG. 11, the insert receiving pocket's lower and upper clamping surfaces 32, 34 may be in clamping contact with the insert's lower and upper abutment surfaces 92, 94, respectively.

Also, as shown in FIG. 11, the insert receiving pocket's stopper surface 36 may be in abutting contact with the insert's rear abutment surface 98.

For embodiments of the present invention in which the tool adaptor's rear mounting portion 24 includes a second fastening bore 60, the tool shank's front mounting portion 78 may have a second shank bore 100 intersecting the front mounting surface 80.

For such embodiments of the present invention, a second fastening screw 102 may occupy the adaptor's second fastening bore 60 and the shank's second shank bore 100.

In some embodiments of the present invention, the second fastening bore 60 and the second shank bore 100 may be coaxial.

Also, in some embodiments of the present invention, the second shank bore 100 may be a threaded bore, and the second fastening screw 102 may threadingly engage the second shank bore 100.

For embodiments of the present invention in which the tool adaptor's front retaining portion 22 includes a clamping bore 58, and the clamping bore 58 has first and second clamping bore portions 58a, 58b spaced apart by the primary slot 42, as shown in FIGS. 9, 10 and 12, a clamping screw 104 may occupy the first and second clamping bore portions 58a, 58b.

For embodiments of the present invention in which the first clamping bore portion 58a is a through bore, and the second clamping bore portion 58b is a threaded bore, the clamping screw 104 may threadingly engage the second clamping bore portion 58b.

It should be appreciated that rotational tightening or loosening of the clamping screw 104 may result in resilient displacement of the clamping jaw 28 relative to the base jaw 26.

It should also be appreciated that rotational tightening or loosening of the clamping screw 104 may result in resilient displacement of the clamping jaw 28 relative to the rear mounting portion 24.

Although the present invention has been described to a certain degree of particularity, it should be understood that various alterations and modifications could be made without departing from the spirit or scope of the invention as hereinafter claimed.

What is claimed is:

1. A tool adaptor (20) having an adaptor axis (AA) defining an adaptor forward-to-rear direction (DF, DR), and comprising:
    a front retaining portion (22) having a base jaw (26), a clamping jaw (28), and an insert receiving pocket (30) located therebetween, the insert receiving pocket (30) having a lower support surface (32) and an opposing upper clamping surface (34), the lower support surface (32) defining a first plane (P1), and
    a rear mounting portion (24) located axially rearward of the front retaining portion (22), the rear mounting portion (24) having an axially rearward facing rear mounting surface (50) and a first fastening bore (54),
    wherein:
    a primary slot (42) separates the base jaw (26) from the clamping jaw (28) and merges with the insert receiving pocket (30);
    a secondary slot (52) transverse to the primary slot (42) and axially spaced apart from the inset pocket (30) in the rearward direction, separates the clamping jaw (28) from the rear mounting portion (24); and
    the first fastening bore (54) has a first bore axis (A1) which intersects the rear mounting surface (50) and the secondary slot (52).

2. The tool adaptor (20) according to claim 1, wherein the first bore axis (A1) intersects the clamping jaw (28).

3. The tool adaptor (20) according to claim 1, wherein the clamping jaw (28) is resiliently displaceable relative to the base jaw (26) and the rear mounting portion (24).

4. The tool adaptor (20) according to claim 1, wherein:
    the first fastening bore (54) is a through bore, and
    the first fastening bore (54) extends through the rear mounting portion (24) and the clamping jaw (28).

5. The tool adaptor (20) according to claim 4, wherein:
the first fastening bore (54) includes a first front bore portion (54a) having a first front diameter (FD1) and a first rear bore portion (54b) having a first rear diameter (RD1),
the first rear bore portion (54b) is entirely located in the rear mounting portion (24),
the first front bore portion (54a) is located axially forward of the first rear bore portion (54b), and
the first front diameter (FD1) is greater than the first rear diameter (RD1).

6. The tool adaptor (20) according to claim 1, wherein:
the lower support surface (32) is formed on the base jaw (26), and
the upper clamping surface (34) is formed on the clamping jaw (28).

7. The tool adaptor (20) according to claim 6, wherein the lower support surface (32) and the upper clamping surface (34) extend along a pocket axis (AP) transverse to the adaptor axis (AA).

8. The tool adaptor (20) according to claim 6, wherein:
the insert receiving pocket (30) has a stopper surface (36) formed on the base jaw (26), and
the stopper surface (36) is transverse to the lower support surface (32).

9. The tool adaptor (20) according to claim 1, wherein the secondary slot (52) merges with the primary slot (42).

10. The tool adaptor (20) according to claim 1, wherein:
the secondary slot (52) comprises a major secondary slot portion (52a) and a minor secondary slot portion (52b), and
the minor secondary slot portion (52b) is inclined with respect to the major secondary slot portion (52a).

11. The tool adaptor (20) according to claim 10, wherein:
a fourth plane (P4) perpendicular to the first plane (P1) bisects the major secondary slot portion (52a).

12. The tool adaptor (20) according to claim 1, wherein:
the base jaw (26) and the clamping jaw (28) mutually merge with a clamping pivot portion (44) adjacent a terminal end portion (46) of the primary slot (42).

13. The tool adaptor (20) according to claim 12, wherein in a cross-section taken in a second plane (P2) perpendicular to the adaptor axis (AA) and passing through the insert receiving pocket (30), the terminal end portion (46) of the primary slot (42) is distally located from the insert receiving pocket (30).

14. The tool adaptor (20) according to claim 12, wherein the clamping pivot portion (44) has a resilient axis of rotation (AR) extending along the adaptor forward-to-rear direction (DF, DR).

15. The tool adaptor (20) according to claim 14, wherein the resilient axis of rotation (AR) intersects the secondary slot (52).

16. The tool adaptor (20) according to claim 1, wherein:
a slot plane (PS) passes through at least a portion of the primary slot (42), in-between the base jaw (26) and the clamping jaw (28), and
in a cross-section taken in a third plane (P3) parallel to the slot plane (PS) and intersecting the clamping jaw (28), the rear mounting portion (24) and the clamping jaw (28) are entirely spaced apart by the secondary slot (52).

17. A tool adaptor (20) having an adaptor axis (AA) defining an adaptor forward-to-rear direction (DF, DR), and comprising:
a front retaining portion (22) having a base jaw (26), a clamping jaw (28), and an insert receiving pocket (30) located therebetween, the insert receiving pocket (30) having a lower support surface (32) and an opposing upper clamping surface (34), the lower support surface (32) defining a first plane (P1), and
a rear mounting portion (24) located axially rearward of the front retaining portion (22), the rear mounting portion (24) having an axially rearward facing rear mounting surface (50) and a first fastening bore (54), wherein:
the front retaining portion (22) includes a clamping bore (58) extending along a clamping axis (AC);
a primary slot (42) separates the base jaw (26) from the clamping jaw (28) and merges with the insert receiving pocket (30);
the clamping bore (58) has first and second clamping bore portions (58a, 58b) spaced apart by the primary slot (42);
a secondary slot (52) transverse to the primary slot (42) separates the clamping jaw (28) from the rear mounting portion (24); and
the first fastening bore (54) has a first bore axis (A1) which intersects the rear mounting surface (50) and the secondary slot (52).

18. The tool adaptor (20) according to claim 17, wherein:
the first clamping bore portion (58a) is a through bore, and
the second clamping bore portion (58b) is a threaded bore.

19. The tool adaptor (20) according to claim 17, wherein:
a fifth plane (P5) perpendicular to the first plane (P1) contains the first bore axis (A1), and
the clamping bore (58) and the insert receiving pocket (30) are located on the same side of the fifth plane (P5).

20. The tool adaptor (20) according to claim 17, wherein in a front view of the tool adaptor (20):
an axial projection of the clamping axis (AC) intersects the insert receiving pocket (30).

21. A cutting tool assembly (74) comprising:
a tool shank (76) longitudinally extending along a shank axis (AS) and comprising:
a front mounting portion (78) having a front mounting surface (80) and a first shank bore (82) intersecting the front mounting surface (80); and
a tool adaptor (20) removably secured to the tool shank's front mounting portion (78), the tool adaptor (20) having an adaptor axis (AA) defining an adaptor forward-to-rear direction (DF, DR), and comprising:
a front retaining portion (22) having a base jaw (26), a clamping jaw (28), and an insert receiving pocket (30) located therebetween, the insert receiving pocket (30) having a lower support surface (32) and an opposing upper clamping surface (34), the lower support surface (32) defining a first plane (P1), and
a rear mounting portion (24) located axially rearward of the front retaining portion (22), the rear mounting portion (24) having an axially rearward facing rear mounting surface (50) and a first fastening bore (54), wherein:
a primary slot (42) separates the base jaw (26) from the clamping jaw (28) and merges with the insert receiving pocket (30);
a secondary slot (52) transverse to the primary slot (42) separates the clamping jaw (28) from the rear mounting portion (24); and
the first fastening bore (54) has a first bore axis (A1) which intersects the rear mounting surface (50) and the secondary slot (52);

and wherein:
the tool adaptor's rear mounting surface (50) interfaces the shank's front mounting surface (80), and
a first fastening screw (84) occupies the adaptor's first fastening bore (54) and the shank's first shank bore (82) to secure the tool adaptor (20) to the tool shank (76).

22. The cutting tool assembly (74) in accordance with claim 21, wherein:
a cutting insert (88) is removably retained in the insert receiving pocket (30),
the cutting insert (88) has one operative cutting edge (90), and
a sixth plane (P6) perpendicular to the adaptor axis (AA) bisects the operative cutting edge (90).

23. The cutting tool assembly (74) in accordance with claim 21, wherein:
the adaptor's front retaining portion (22) includes a clamping bore (58),
the clamping bore (58) has first and second clamping bore portions (58*a*, 58*b*) spaced apart by the primary slot (42),
a clamping screw (104) occupies the first and second clamping bore portions (58*a*, 58*b*), and
rotational tightening or loosening of the clamping screw (104) results in resilient displacement of the clamping jaw (28) relative to the base jaw (26).

* * * * *